Figure 1:
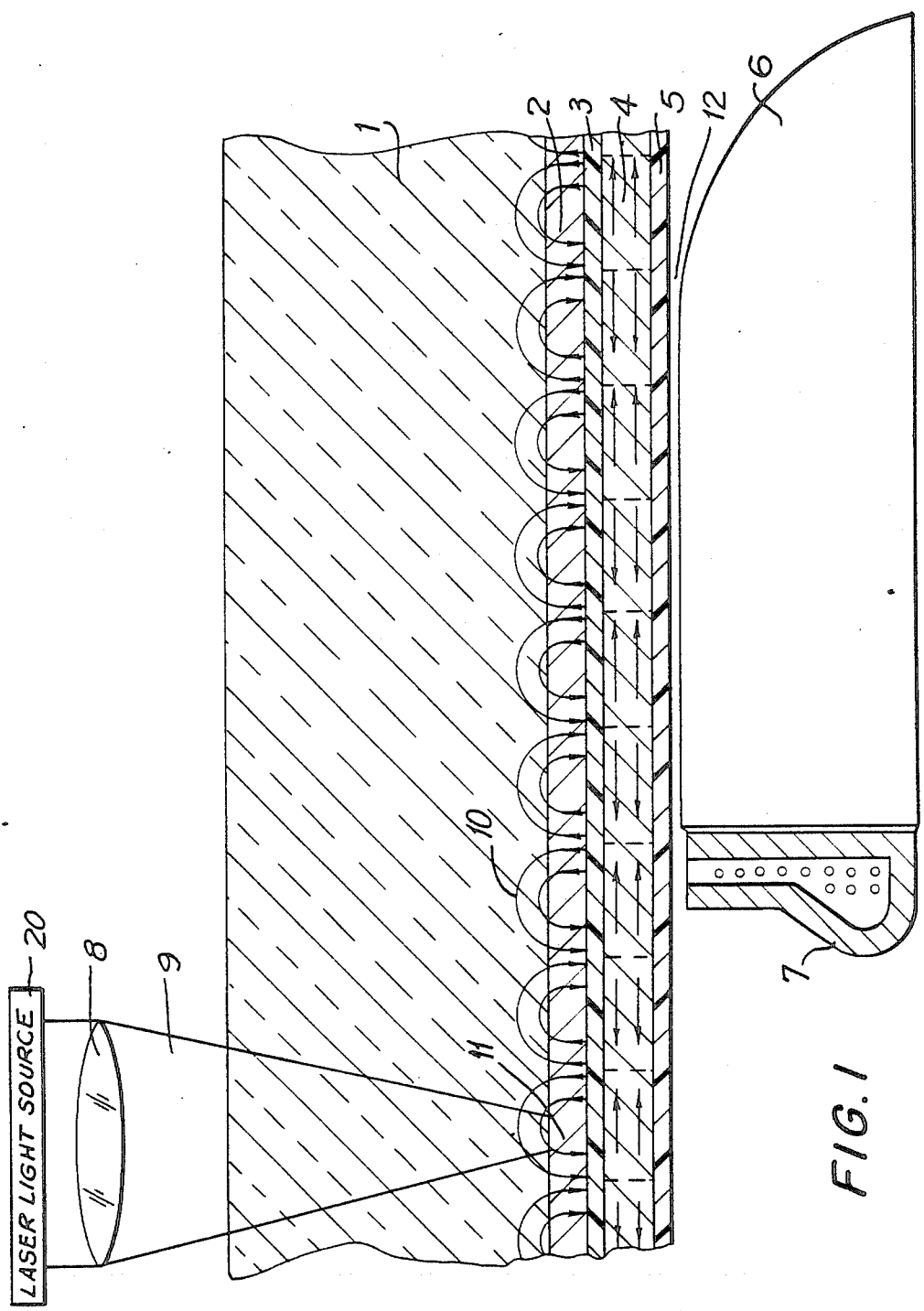

United States Patent [19]

Muchnik et al.

[11] Patent Number: 4,694,358
[45] Date of Patent: Sep. 15, 1987

[54] MAGNETO-OPTIC RECORDING STRUCTURE AND METHOD

[75] Inventors: Boris J. Muchnik; Fred W. Spong, both of Boulder, Colo.

[73] Assignee: Kerdix, Inc., Boulder, Colo.

[21] Appl. No.: 792,148

[22] Filed: Oct. 28, 1985

[51] Int. Cl.$^4$ .......................... G11B 5/02; G11B 5/06; G11B 11/00; G11B 13/00
[52] U.S. Cl. ........................................ 360/59; 360/16; 360/17; 360/135; 369/13; 369/14
[58] Field of Search ................ 366/15, 16, 17, 59, 366/135; 369/13, 14, 15

[56] References Cited

U.S. PATENT DOCUMENTS 2,950,971  8/1960  Lewin ................................. 369/14
3,239,841  3/1966  Henkes, Jr. ........................ 369/14

Primary Examiner—Vincent P. Canney
Attorney, Agent, or Firm—Rosen, Dainow & Jacobs

[57] ABSTRACT

A magnetic magneto-optic recording structure and method in which a magneto-optic active layer is positioned within the fringing magnetic field of a magnetic recording medium, the structure preferably being disk-shaped. The magneto-optic layer is irradiated by a continuous wave laser beam, by way of a transparent substrate thereon, to locally reduce the coercivity of the magneto-optic layer, so that the magneto-optic layer becomes locally magnetized to align itself with the fringing magnetic fields created by the magnetization pattern of information previously recorded on the magnetic recording layer. The information thus recorded on the magneto-optic layer can be read out with a laser beam of lesser power, employing the Kerr effect.

15 Claims, 2 Drawing Figures

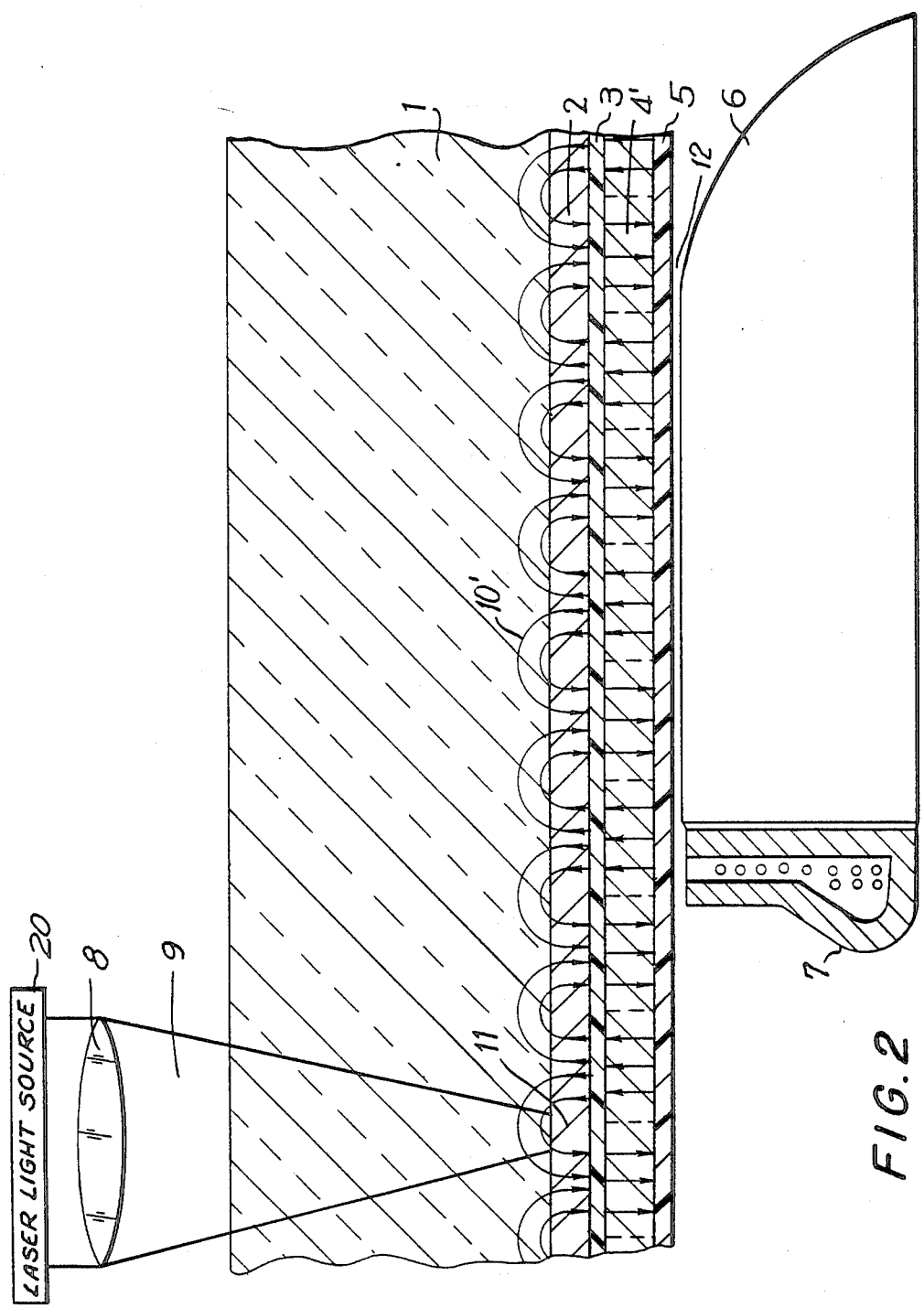

MAGNETO-OPTIC RECORDING STRUCTURE AND METHOD

This invention relates to magneto-optic recording, and is more particularly directed to a magneto-optic recording structure and method.

The computer industry has generated an enormous and continually increasing demand for data storage as new applications are discovered and cost reductions make them practical. This demand has encouraged the continued development of magnetic recording and, more recently, the development of magneto-optic recording.

Driven by the demand for higher capacity and lower cost, the history of magnetic recording has been one of continual evolution to higher packing densities of data. The recent development of optical recording technology represents a considerable advance in attainable density, particularly with respect to track density.

Magneto-optic recording media and systems have been disclosed, for example, in U.S. Pat. No. 4,466,035, Connell, having a magneto-optic recording layer. The recording of information on such a film is effected by directing a modulated laser beam to the surface of the film, the laser beam power being sufficient to heat the film locally, for example, to the Curie temperature of the film. The film may be initially magnetically polarized in one direction, for example, vertically on the film and a magnetic field of the opposite polarity is provided adjacent the film. Those areas of the film impinged by the beam will consequently have their polarity reversed.

Magneto-optic recording thereby provides means for recording information at a density substantially greater than can be achieved with conventional magnetic recording. Thus, the laser may have a very small focused spot on the film, for example, from 0.5 to 1.0 micrometer in diameter so that the recording density may be very great.

In readout of the recorded information, a laser beam of lesser intensity is scanned across the recorded film, various techniques being employed to reproduce information relying upon the reflected light from the magneto-optic film using the Kerr effect.

Conventional magnetic recording technology also continues to evolve toward higher densities and lower costs, and retains certain inherent advantages over the newer optical technology. For example, one advantage of conventional magnetic recording over present versions of optical technology is related to the relative compactness and light weight of the magnetic recording head. With respect to disk drives, this means that the magnetic head can be positioned radially very rapidly because of the low inertia of the head, with consequent advantage with respect to access time for random reading and writing of data. Furthermore, magneto-optic recording at present suffers from the lack of a 'writeover' capability, i.e. a data track must be erased before it can be rewritten. Erasure requires one pass of the disk, or a separate optical head, and so reduces access time.

It has therefore been proposed to combine advantageous features of magnetic and magneto-optic recording. For example, as disclosed in "thermo-magnetic writing in a $CrO_2$-based composite Magneto-Optic Medium", T. Nomura, FERRITES: Proceedings of the International Conference, Sept. -Oct. 1980, Japan, Pages 795-797, a chromium oxide coated tape is placed in contact with a film having an intermediate garnet layer overcoated with a transparent substrate. A laser beam passing through the substrate of the magnetic garnet film is focused on the chromium oxide layer of the other film to heat a spot on the chromium oxide layer to about the Curie temperature while a magnetic film is provided adjacent the tape to magnetically record information in the chromium oxide layer. In this arrangement the laser beam is pulsed. The bit patterns of the chromium oxide film are replicated on the magnetic garnet film by the stray fields of the chromium oxide film. The information can be read out of the garnet film employing a laser light of a wavelength that is reflected from the dielectric film between the garnet film and the chromium oxide film, by means of the magneto-optic Faraday effect.

In a further combination of magnetic and magneto-optic recording, as disclosed in "New Concepts on Magneto Optical Memories", C. Gueugnon et al., IEEE Transactions on Magnetics, Volume Mag-19, No. 5, Sept. 1983, pages 1754-1756, information is written directly by perpendicular magnetic recording onto a film of a composition having a high Kerr rotation. Information is read from the layer by employing the Kerr effect, employing a plurality of photo detectors, with the outputs of the photo detectors being autocorrelated.

It is the object of the present invention to provide an improved magnetic magneto-optic recording structure and method employing a single structure enabling layer to layer transfer within the medium of the structure, and wherein the information in a magnetic film is prerecorded before transfer of the information to a magneto-optical layer. The structure and method in accordance with the invention achieves high track density associated with optical recording and the rapid access times associated with conventional magnetic recording. The invention further solves the 'writeover' problem of magneto-optic recording.

In accordance with the invention, a magnetic-magneto-optic recording structure is comprised of a transparent substrate coated with a layer of magneto-optic material having perpendicular anisotropy. The magnetic recording layer of this structure may be separated if necessary from the magneto-optic recording layer by a layer of thermal isolation. Suitable protective layers may be provided on the structure if necessary.

The structure in accordance with the invention may be separated if necessary from the magneto-optic recording layer by a layer of thermal isolation. Suitable protective layers may be provided on the structure if necessary.

The structure in accordance with the invention enables the magnetic recording on the magnetic recording layer by conventional techniques, for example, employing a slider flying on a film of air supported adjacent the magneto-optic layer.

During recording, a laser beam is focused onto the magneto-optic layer by way of the transparent substrate, heating it above the Curie point or the compensation point in a manner well known in the art of magneto-optic recording. The laser beam is a continuous wave beam (not modulated), and reduces the coercivity of the magneto-optic layer in the highly localized region of the focused laser beam. This permits the information recording in the magnetic recording layer to be transferred to the magneto-optic layer according to principles well known in the art of thermo-magnetic writing and magneto-optic recording.

The information, thus thermo-magnetically transferred from a track of the magnetic layer to a very narrow track of the magneto-optic layer, can be read out by means of the polar Kerr effect employing a laser beam at a reduced power level. A relatively wide magnetic track may thus be employed to record the narrow magneto-optic track, and hence closely spaced magneto-optic tracks may be separately recorded at different times from separate wide track magnetic recordings.

The magnetic layer may be longitudinally or perpendicularly recorded.

In order that the invention may be more clearly understood, it will now be disclosed in greater detail with reference to the accompanying drawings, wherein:

FIG. 1 is a cross-sectional view of a portion of a magnetic recording structure and associated recording and reading elements in acordance with one embodiment of the invention; and FIG. 2 is a cross-sectional view of a portion of a recording structure and the associated recording and reading elements, in accordance with a further embodiment of the invention.

The invention may be better understood by considering it as a combination of two technologies, optical recording (i.e. magneto-optical recording) and more or less conventional magnetic recording, wherein the term "conventional" magnetic recording refers not only to conventional "in-plane" magnetization, but also to the more recent laboratory developments in so-called "vertical" recording in which the magnetization is perpendicular to the plane of the medium. Thus, longitudinal and vertical magnetic recording techniques are applicable to the recording structure and method in accordance with the invention.

FIG. 1 illustrates in simplified form the essential features of an embodiment of the invention employing longitudinal magnetic recording. In this arrangement, a transparent disk substrate 1 is coated with a layer 2 of magneto-optic material having perpendicular anisotropy. Such materials are well-known in the art of magneto-optic recording and may include, for example only, amorphous rare-earth and transition metal alloy films. A layer 3 of thermal isolation material may be provided between the magneto-optic material layer 2 and a magnetic recording layer 4. The layer 3 may be provided if it is necessary to provide a barrier against chemical interdiffusion between the elements of the magneto-optic layer 2 and the magnetic recording layer, the layer 3 also serving to insulate the magnetic recording layer 4 from heat effects of the laser beam during recording if such is necessary. A layer 5 may optionally be provided on the magnetic recording layer 4, to provide a tough-scratch-resistant protecting surface and also to provide a chemical barrier protection of the magnetic recording layer against, for example, oxidation, if an oxidizable material is employed for the layers 2 or 4. In one embodiment of the invention, the recording layer 4 may be constituted of a conventional dispersion of gamma ferric oxide ($\gamma$-$Fe_2O_3$) particles in a polymer binder, as is conventionally practiced in the art of magnetic recording. When such a magnetic layer is provided, the protective layer 5 is unnecessary.

The transparent disk substrate 1 is adapted for rotation by any conventional means (not shown). A slider 6 of conventional construction is adapted to fly on a film of air and support a thin film head 7 ajacent the magnetic recording layer, in conventional manner in the art of magnetic recording. Such arrangements are provided, for example, in IBM 3380 magnetic disk drives of the IBM Corporation or STC 8380 magnetic disk drive of Storage Technology Corporation.

In recording information in the magnetic magneto-optic recording structure of the invention, information is first recorded on circular tracks of the magnetic recording layer 4, by the thin film head 7, in conventional manner. The tracks recorded on the magnetic film may be relatively wide. A lens 8 is provided to focus a laser beam 9 onto the magneto-optic layer 2, to heat it above the critical temperature such as a Curie point or the compensation point in a manner well-known in the art of magneto-optic recording. As opposed to conventional magneto-optic recording techniques, however, the laser beam from the source 20 is not modulated on and off to record the information, but operates in continuous wave (c.w.) mode. The beam serves to reduce the coercivity of the magneto-optic layer in a highly localized region 11 of the focused laser beam. This permits the information recorded in the magnetic recording layer 4 to be transferred to the magneto-optic layer according to principles well known in the art of thermo-magnetic writing and magneto-optic recording. Briefly, in the locally heated region 11, the thermo-magnetic spins are momentarily thermally randomized in orientation. As they cool in the presence of the fringing fields 10 of the magnetization pattern 12, the thermo-magnetic spins reorient parallel to the fringing fields 10. In this condition the information so transferred from the magnetic recording layer 4 to the magneto-optic layer 2 can be read by the polar Kerr effect employing the laser beam 9 at a power level reduced from that employed for the thermo-magnetic information transfer. It is of course apparent that alternatively separate beams may be employed for the thermo-magnetic transfer and for readouts of information.

Means for optimally detecting the magneto-optic signal, maintaining focus, tracking, grooving substrate, etc. are all well-known in the art of magneto-optic recording and need not be discussed specifically herein except to say that they can be usefully exploited in the practice of the invention.

Once the information from one track of the magnetic layer has been thermo-magnetically transferred to the adjacent relatively narrow track in the magneto-optic layer, tracks of the magnetic layer can be rewritten magnetically without disturbing the information stored in the magneto-optic layer, since the coercivity of the magneto-optic layer is high except when heated to a transition temperature. As a consequence, information newly recorded in the magnetic layer may be thermo-magnetically transferred as before to a second track of the magneto-optic layer that is closely spaced to the previously recorded track therein. It is thus apparent that the density of tracks recorded in the magneto-optic layer may be substantially greater than that of the tracks recorded in the magnetic recording layer.

The embodiment of the invention illustrated in FIG. 2 differs from that of FIG. 1 only in that the longitudinally recordable magnetic recording layer 4 has been replaced by a magnetic layer 4 for vertical magnetic recording, in which the magnetization of the layer is predominantly perpendicular to, rather than in the plane of the recording structure disk. As illustrated in FIG. 2, the fringing fields 10 of the vertical magnetic recording have spatially dependent components in the magneto-optic layer, as in the case of the fringing fields 10 of FIG. 1, which are sufficient for laser beam induced transfer of the information to the magneto-optic layer in a manner subject to readout by the polar Kerr effect.

The invention thus provides means for solving the "writeover" problem for magneto-optic recording, reducing the latency time required for erasure. This renders the access time for magneto-optic recording competitive with magnetic disk technology, while retaining the density-capacity advantage of magneto-optical recording. It is also apparent that the magnetic recording layer may alternatively separately function as an ordinary magnetic recording disk, so that the recording structure in the invention provides two modes of operation, for example, in the magneto-optic mode as above discussed, and alternatively, in a very high speed random access scratch pad storage mode employing only the magnetic recording layer in a very fast magnetic recording/playback mode. When higher track density and capacity of the optical recording mode are required, the drive may be switched by conventional means into that mode, which is still fast with respect to latency, although somewhat slower than the magnetic mode owing to the greater inertia of the optical head as compared with that of the magnetic head.

Since the laser beam is a continuous wave rather than modulated, it is readily feasable to employ multi-track multi-channel recording at very high data rates, employing multiple heads or integrated arrays of thin film magnetic heads and multiple beams. This advantage arises since it is easier to provide arrays of focused spots of continuous wave beams than it is to provide individually modulated beams. Since it is only required that the laser beams be continuous wave beams, gas lasers may be economically employed, thereby permitting the use of shorter wavelengths than are available with the more easily modulated diode lasers. It is apparent that such shorter wavelengths enable greater resolution and packing density than that possible with the longer wavelengths required when diode lasers are employed.

Since the information is first recorded by conventional magnetic recording on a relatively wide track in comparison with that associated with the focused optical beam, azimuthal registration is not required between the magnetic and optical heads, and radial registration is required only to the relatively loose tolerance of the magnetic track width.

While the invention has been disclosed and described with reference to a limited number of embodiments, it is apparent that variations and modifications may be made therein, and it is therefore intended in the following claims to cover each such variation and modification as follows within the true spirit and scope of the invention.

What is claimed is:

1. An integral recording structure comprising a magneto-optic layer and an opposed magnetic recording layer, data when magnetically recorded on said magnetic recording layer produces fringing magnetic fields, the magneto-optic layer being positioned to fall within the fringing magnetic field of data magnetically recorded on said magnetic recording layer, said magneto-optic layer being subject to local magnetization in alignment with said fringing field by reduction of the coercivity of the magneto-optic layer, said reduction being effected by application of a laser beam to said magneto-optic layer.

2. The recording structure of claim 1 wherein said structure is disk-shaped, and further comprising a transparent substrate, said magneto-optic layer comprising a magneto-optically active layer on said transparent substrate.

3. The recording structure of claim 2 wherein said magneto-optically active layer is an amorphous alloy of rare earth and transition metals having a perpendicular anisotropy.

4. The recording structure of claim 3 wherein the rare earth elements of the magneto-optically active layer are selected from the group consisting of gadolinium, terbium and dysprosium, and the transition metal is selected from the group consisting of iron, cobalt and nickel.

5. The recording structure of claim 2 wherein the magnetic recording layer is comprised of a dispersion of gamma ferric oxide particles in a polymeric binder.

6. The recording structure of claim 4 wherein said magnetic recording layer is comprised of a dispersion of gamma ferric oxide particles in a polymeric binder.

7. The recording structure of claim 2 wherein said magnetic recording layer is of chromium dioxide.

8. The recording structure of claim 4 wherein said magnetic recording layer is of chromium dioxide.

9. The recording structure of claim 1 wherein said magnetic recording layer is adapted for vertical recording.

10. The recording structure of claim 2 further comprising an intervening dieletric layer between said magneto-optic layer and said magnetic recording layer for thermally and chemically isolating said magnetic recording layer and said magneto-optic layer.

11. An information recording and playback device comprising a disk-shaped recording media, said recording media comprising a transparent substrate, a magneto-optically active layer on said substrate, and a magnetic recording layer, data when magnetically recorded on said magnetic recording layer produces fringing magnetic fields, the magneto-optically active layer being positioned to fall within the fringing magnetic field of data magnetically recorded on said recording layer, said magneto-optically active layer being subject to local magnetization in alignment with said fringing field by reduction of the coercivity of the magneto-optic layer, said reduction being effected by application of a laser beam to said magneto-optic layer, a magneto-optical read and write means comprising a source of a laser beam for addressing said magneto-optic layer through said transparent layer, and a magnetic recording-playback head positioned to address said magnetic recording layer on the side of said recording structure opposite said transparent substrate.

12. A method for recording data on an integral recording structure including a magneto-optic layer and an opposed mangetic recording layer, comprising:
 recording data on said magnetic recording layer,
 after said recording, irradiating with a focused laser beam spots of said magneto-optic recording layer, said spots being within the fringing magnetic field produced by said recorded data of the magnetic recording layer,
 applying sufficient energy with said laser beam to raise said spots to a transition temperature permitting local magnetization of said magneto-optic layer to align itself with said fringing magnetic field.

13. The method of claim 12 wherein said step of irradiating comprises irradiating said magneto-optic layer with a focused continuous wave laser beam of sufficient energy to reduce the coercivity of said magneto-optic layer.

14. A method for recording data as claimed in claim 12 and further comprising:
reducing the energy of said laser beam allowing said spots on said magneto-optic layer to cool below said transition temperature, and reading said information on said magneto-optic layer by the Kerr effect with a laser beam of lesser intensity.

15. The method of claim 14 wherein said step of irradiating said magneto-optic recording layer within the fringing magnetic field of the magnetic recording layer comprises irradiating said magneto-optic layer with a continuous wave laser beam of sufficient intensity to reduce the coercivity of said magneto-optic layer.

* * * * *